(12) United States Patent
Obendiek et al.

(10) Patent No.: US 7,178,852 B2
(45) Date of Patent: Feb. 20, 2007

(54) TOP FOR A CONVERTIBLE

(75) Inventors: Klaus Obendiek, Passau (DE); Franz Haberl, Wallerfing (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 0 days.

(21) Appl. No.: 10/976,705

(22) Filed: Oct. 29, 2004

(65) Prior Publication Data

US 2005/0280279 A1 Dec. 22, 2005

(30) Foreign Application Priority Data

Oct. 31, 2003 (DE) ................. 103 51 062

(51) Int. Cl.
*B60J 7/14* (2006.01)

(52) U.S. Cl. ............ 296/107.17; 296/108; 296/107.08; 296/136.06

(58) Field of Classification Search ................ 296/108, 296/107.08, 107.17, 107.16, 136.06
See application file for complete search history.

(56) References Cited

U.S. PATENT DOCUMENTS

| 6,019,417 | A | * | 2/2000 | Haberl | 296/136.06 |
|---|---|---|---|---|---|
| 6,053,560 | A | * | 4/2000 | Rothe | 296/108 |
| 6,312,042 | B1 | * | 11/2001 | Halbweiss et al. | 296/108 |
| 6,592,169 | B2 | * | 7/2003 | Obendiek | 296/107.07 |
| 6,637,802 | B2 | * | 10/2003 | Obendiek | 296/108 |
| 6,767,045 | B2 | * | 7/2004 | Reinsch | 296/107.17 |
| 6,948,762 | B2 | * | 9/2005 | Antreich | 296/136.06 |
| 2003/0201658 | A1 | * | 10/2003 | Obendiek et al. | 296/108 |
| 2005/0218691 | A1 | * | 10/2005 | Obendiek | 296/108 |

FOREIGN PATENT DOCUMENTS

| DE | 10119069 | 10/2002 |
|---|---|---|
| DE | 10117767 | 7/2003 |

* cited by examiner

*Primary Examiner*—Jason Morrow
(74) *Attorney, Agent, or Firm*—Davidson, Davidson & Kappel, LLC (57) ABSTRACT

A top for a convertible vehicle includes a roof module having at least one rigid roof part, the roof module being connected to the vehicle by way of a main link mechanism. The roof module is movable over the course of an opening movement of the top into a rear-side storage region of the vehicle. The main link mechanism includes a main four-bar linkage and a second four-bar linkage constructed on the main four-bar linkage. The second four-bar linkage is coupled in a positively controlled manner to the main four-bar linkage.

21 Claims, 10 Drawing Sheets

TOP FOR A CONVERTIBLE

Priority is claimed to German Patent Application No. DE 103 51 062.1, filed on Oct. 31, 2003, the entire disclosure of which is incorporated by reference herein.

The invention relates to a top for a convertible, comprising a roof module comprising at least one rigid roof part, the roof module being connected to the vehicle by means of a main link mechanism, which comprises a main four-bar linkage, and the roof module being movable over the course of an opening movement of the top into a rear-side storage region.

BACKGROUND

In contrast to conventional cloth folding tops, hard-shell collapsible tops basically involve the problem that, on the one hand, in order to avoid unattractive body joints, there should be as few shell parts as possible which are therefore as large as possible but, on the other hand, the large shell parts cause increased complexity for the automated stowage of them in a rear-side storage region of the vehicle.

DE 101 19 069 A1 describes a three-part hard-shell collapsible top for a convertible, in which a roof module is connected to the vehicle body by means of a main link mechanism, the roof module first of all being brought, during an opening movement of the top, into a position in which the three roof parts form a package and the package of roof parts then being put away in a rear-side storage region of the vehicle by means of the main link mechanism.

DE 101 17 767 C2 describes a rear-side covering for a convertible, which covering, in a closed state of the top, is arranged under a rear part of the top in a manner similar to a rear parcel shelf and which is movable at the same time as an opening or closing movement of the top in a positively controlled manner via a link mechanism in order to temporarily open up a stowage space for the top.

SUMMARY OF THE INVENTION

It is an object of the present invention to improve a top mentioned at the beginning for a convertible to the effect that great flexibility is achieved for the stowage of the top.

A top for a convertible according to the invention comprises a roof module comprising at least one rigid roof part, the roof module being connected to the vehicle by means of a main link mechanism, which comprises a main four-bar linkage, and the roof module being movable over the course of an opening movement of the top into a rear-side storage region, wherein the main link mechanism comprises a second four-bar linkage constructed on the main four-bar linkage, the second four-bar linkage being coupled in a positively controlled manner to the main four-bar linkage.

The coupling of at least two four-bar linkages to the main link mechanism advantageously makes it possible for the roof module to be able to be moved over an optimum path of motion into the rear-side storage region.

In one preferred embodiment of a top according to the invention, the roof module, as an essentially unchangeable element with regard to a spatial shape enveloping the roof module, can be brought over the course of an opening movement of the top into the rear-side storage region by means of the main link mechanism. The effect advantageously achieved by this is that the roof module initially takes up a minimum amount of space before it is brought, by means of the movement that is optimized by the main link mechanism according to the invention, into the storage region in such a manner that only a small passage opening to the storage region is required. In this case, the spatial shape of the roof module remains essentially unchanged at least in the last section of an opening movement of the top. The roof module here particularly advantageously has an end-side cross-sectional surface, an opening in the storage region being provided for guiding the roof module through, said opening corresponding essentially to the end-side cross-sectional surface. The enveloping spatial shape of a roof module will frequently roughly correspond to an elongate rectangular parallelepiped, in which the end-side cross-sectional surface is smaller than that surface of the rectangular parallelepiped or packet-shaped roof module which comprises a longitudinal side.

The main link mechanism is particularly preferably designed as a ten-joint linkage, the vehicle body forming a base of the ten-joint linkage, and the roof module forming a connecting bar of the ten-joint linkage. A ten-joint linkage of this type includes the main four-bar linkage and the second four-bar linkage as subsets of link mechanisms which are coupled to one another. In a particularly preferred manner in this case, the body is a base of the main four-bar linkage, the links of the main four-bar linkage that are spaced apart in a defined manner are at the same time the base of the second four-bar linkage and the roof module is the connecting bar of the second four-bar linkage. As an alternative, however, a connecting bar of the main four-bar linkage may also at the same time be the base of the second four-bar linkage. In order to achieve an even more far-reaching adaptation to the particular conditions for the stowage movement of the top, the main link mechanism may, however, also be designed as a thirteen-joint linkage or as a link mechanism with an even higher number of linkages.

A pivoting of the second four-bar linkage related with an opening movement of the top preferably takes place in an opposed manner to a pivoting of the main four-bar linkage. The effect achieved by this is that a space-consuming pivoting movement of the one four-bar linkage is at least partially compensated for by the opposed movement of the other four-bar linkage, with the result that overall a linear or, depending on the configuration of the link mechanism, also an S-shaped movement of the roof module takes place.

The main link mechanism can preferably be moved in a drivable manner by means of a power input unit, so that an automatic drive of the movement of the top is made possible. A drive of this type can be designed, for example, as a piston/cylinder unit arranged between one of the links of the main link mechanism and the vehicle body or as a piston/cylinder unit arranged between two links of the main link mechanism. As an alternative, another drive, for example an electric motor drive or a rotatory hydraulic cylinder, may be provided.

In an alternative embodiment of a top according to the invention, at least one link of the main link mechanism is designed such that it is variable in its length, in particular is designed as a piston/cylinder unit. This makes it possible to achieve additional flexibility in defining the trajectory curve of the roof module or the movement of the main link mechanism.

In a particularly preferred embodiment of a top according to the invention, the roof module comprises a supporting link, a front roof part and a rear roof part, the front roof part and the rear roof part being connected to the supporting link by means of a positive control mechanism. In particular, the front roof part and the rear roof part are preferably connected to the supporting link in each case by means of a positive control mechanism, for example a four-bar linkage. Particularly preferably, during an opening movement of the top the rear roof part can be pivoted in the direction of travel and the front roof part can be pivoted counter to the direction of travel, the rear roof part coming to lie under the front roof part and the two roof parts essentially covering the supporting link. The positive control mechanisms of the two roof parts are particularly preferably coupled to each other.

In one advantageous variant of this embodiment, a central roof part forming a unit together with the supporting link is also provided, thus resulting overall in a three-part hardshell collapsible top. Depending on the shape and therefore preferred stacking of the shell parts, the respective positive control mechanisms of the front and rear roof part may be configured in such a manner that the stacking of the three roof parts takes place in any desired sequence. In general, the stacking will preferably take place with a uniformly directed convexity in order to obtain a package size which is as small as possible for the stacked roof parts. As an alternative, however, one of the roof parts may also be stacked with a convexity the other way round to the other roof parts.

In a further alternative for a top according to the invention provision is made for the roof module to comprise at least two rigid roof parts, one of the rigid shell parts forming a link of the main link mechanism. This roof part may, in particular, also be a rear roof part of a multi-part hard-shell collapsible top. As an alternative to this, however, the roof module may also comprise just a single rigid roof part.

Generally, for a top according to the invention provision is advantageously made for the roof module, before it is placed into the storage region, to be designed essentially as a package of roof parts arranged one above the other.

In the case of a top according to the invention, a pivotable top-compartment lid which closes the storage region for the top in the open state of the top is particularly preferably provided. In particular, a trunk lid is advantageously provided in addition to the top-compartment lid, the trunk lid being pivotable with respect to the vehicle body independently of the top-compartment lid. A top according to the invention makes it possible for the top-compartment lid to be particularly small in size, as is known, for example, from the sphere of conventional folding tops. By this means, a sufficient body surface for a conventional trunk lid is available behind the top-compartment lid.

Further advantages and features of the top according to the invention arise from the exemplary embodiment described below and from the dependent claims.

BRIEF DESCRIPTION OF THE DRAWINGS

In the following text, a preferred exemplary embodiment of a top according to the invention is described and explained in greater detail with reference to the attached drawings, in which.

DETAILED DESCRIPTION OF A PREFERRED EMBODIMENT

Figure 1:
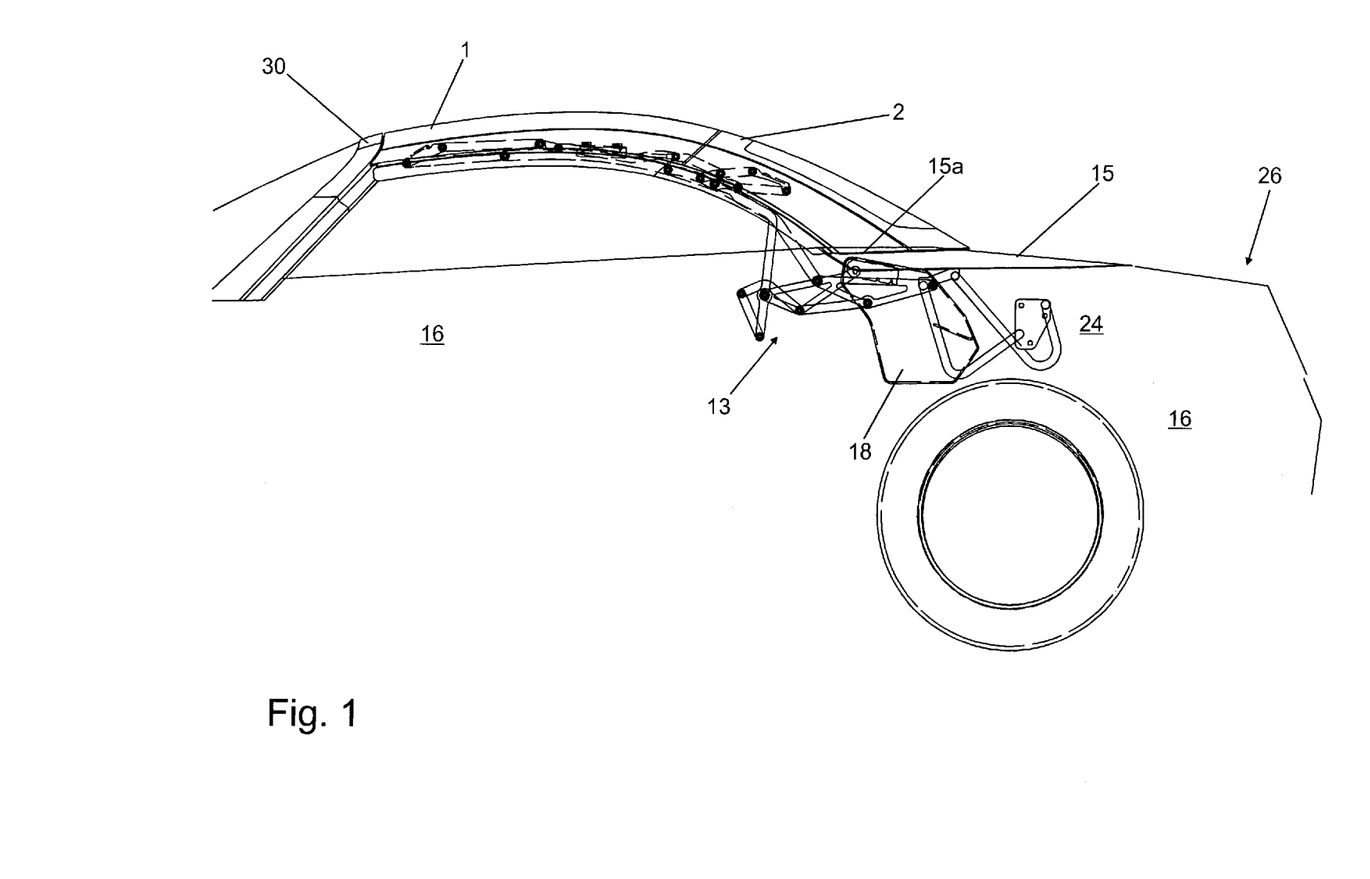
FIG. 1 shows a side view of a top according to the invention in a closed state of the top.
Figure 2:
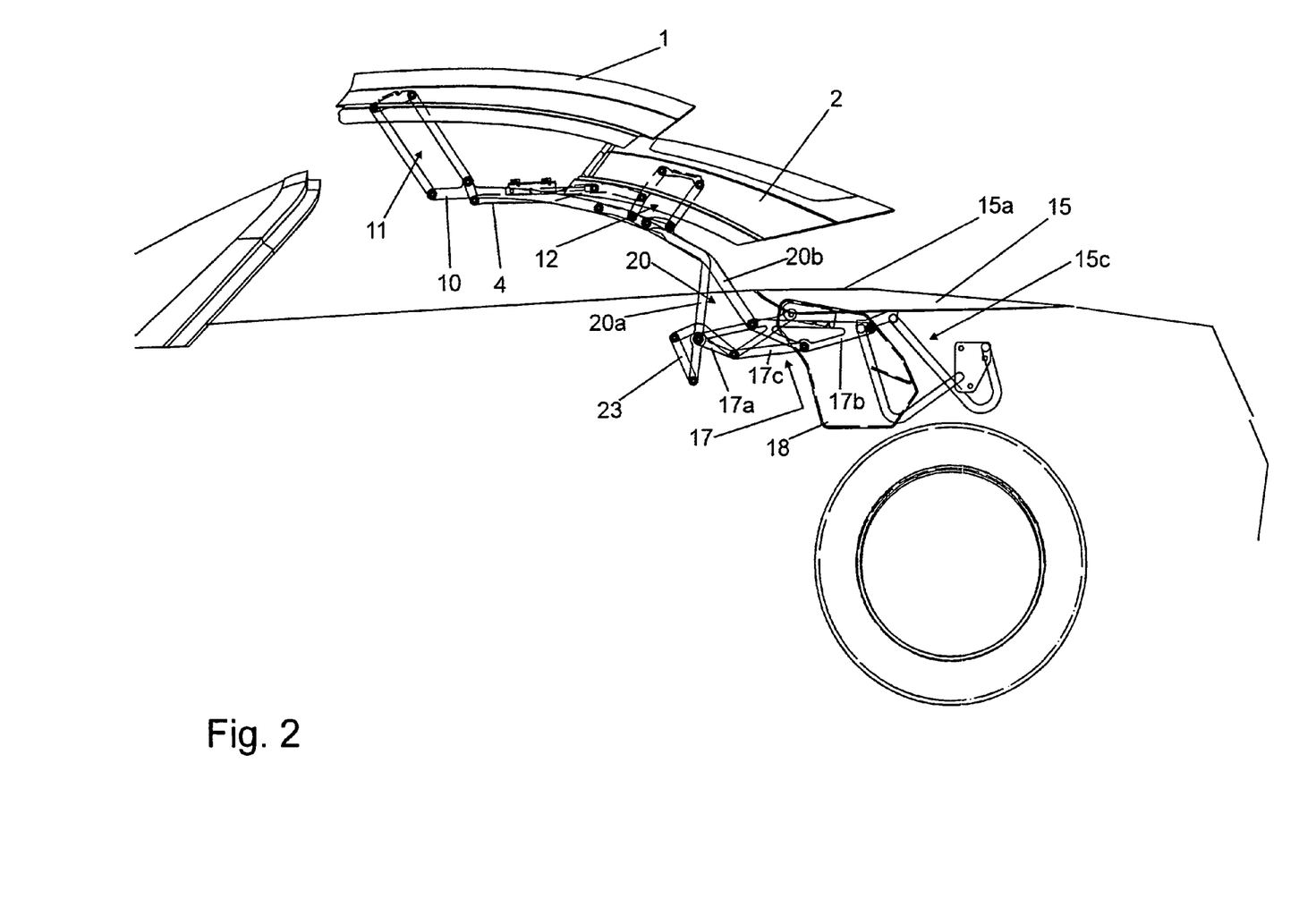
FIG. 2 shows the top from FIG. 1 after a first step of an opening movement of the top.
Figure 3:
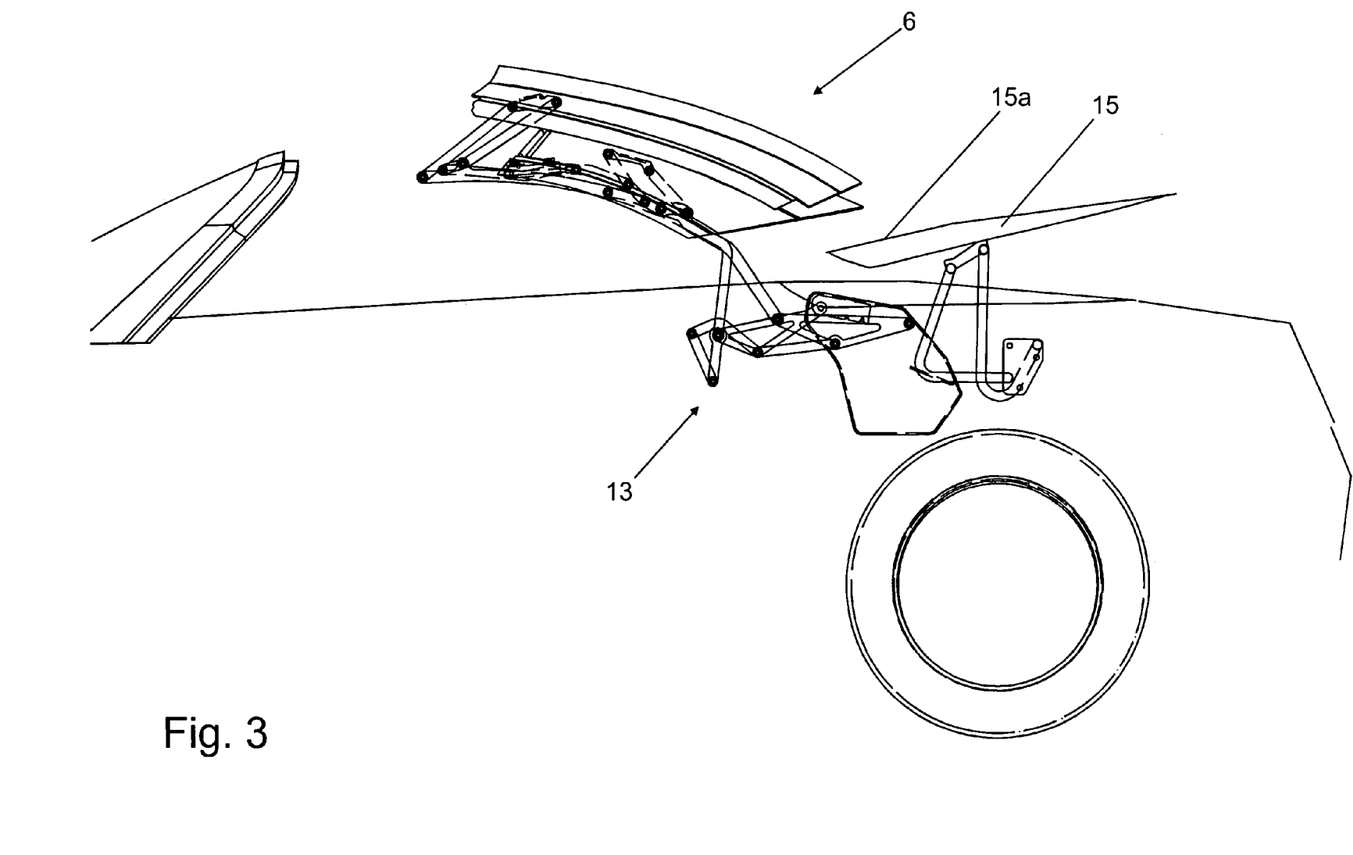
FIG. 3 shows the top from FIG. 1 after a second step of an opening movement of the top, a roof module being designed to form a package of roof parts.
Figure 4:
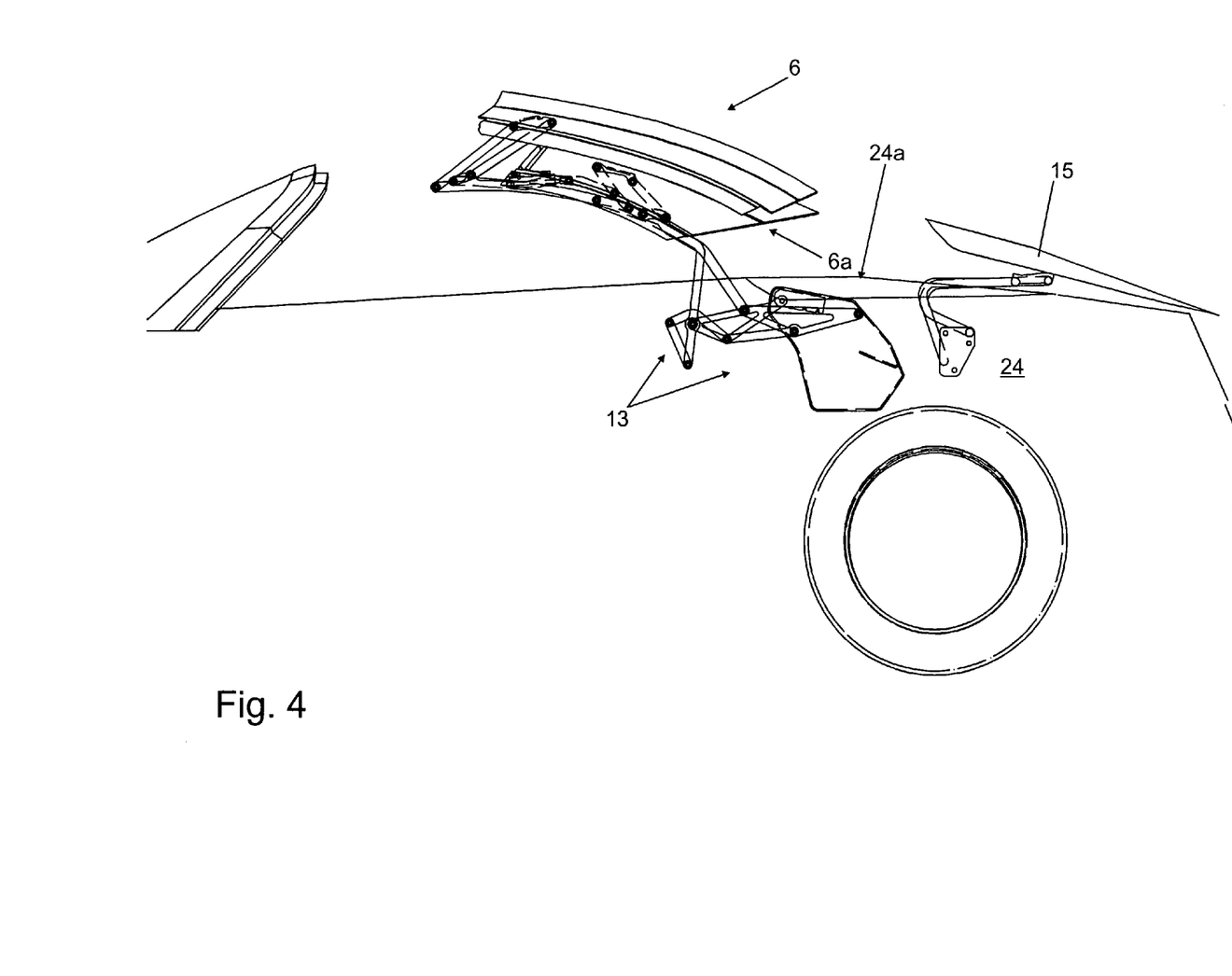
FIG. 4 shows the top from FIG. 1 after a third step of an opening movement of the top.
Figure 5:
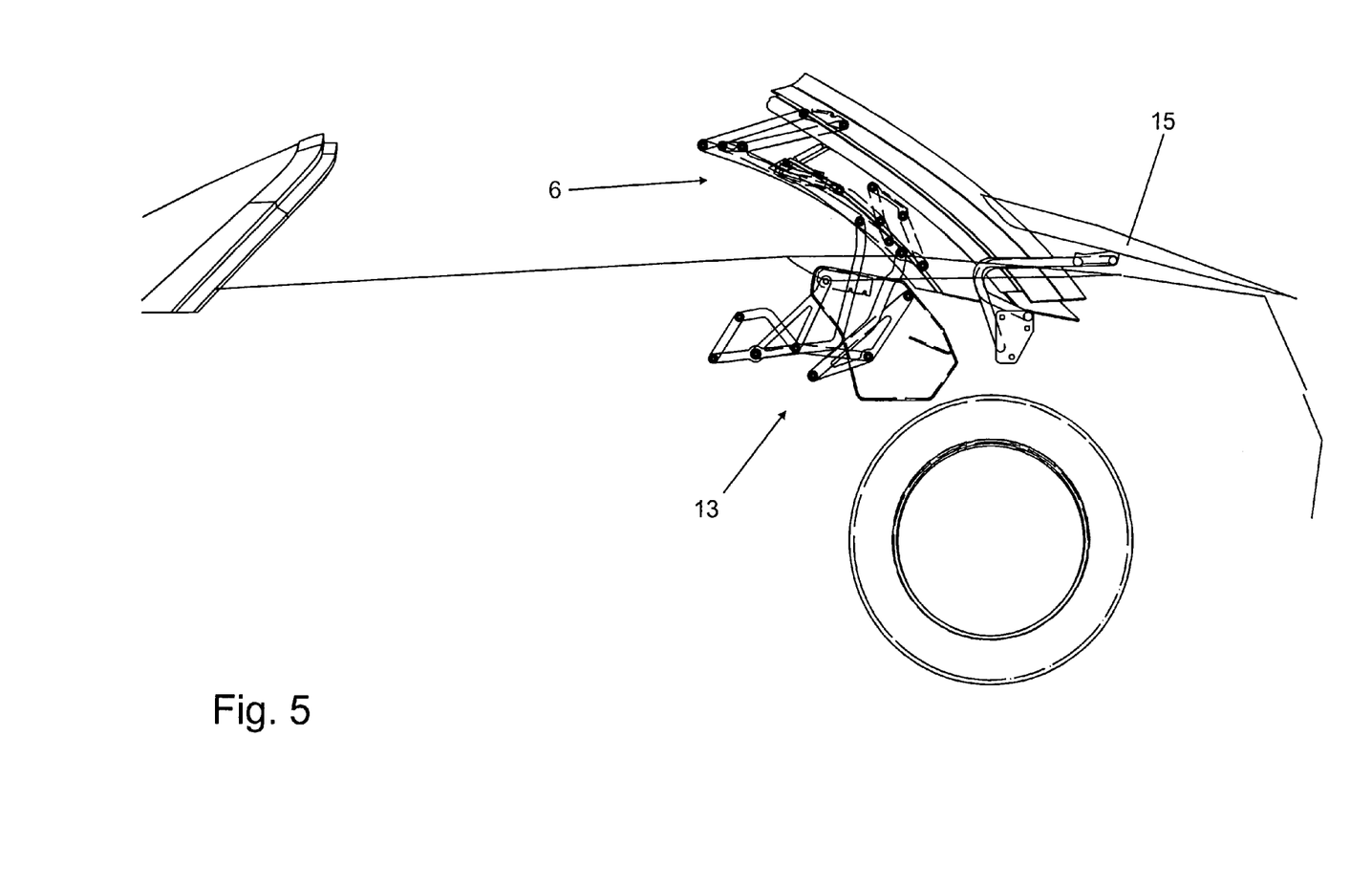
FIG. 5 shows the top from FIG. 1 after a fourth step of an opening movement of the top.
Figure 6:
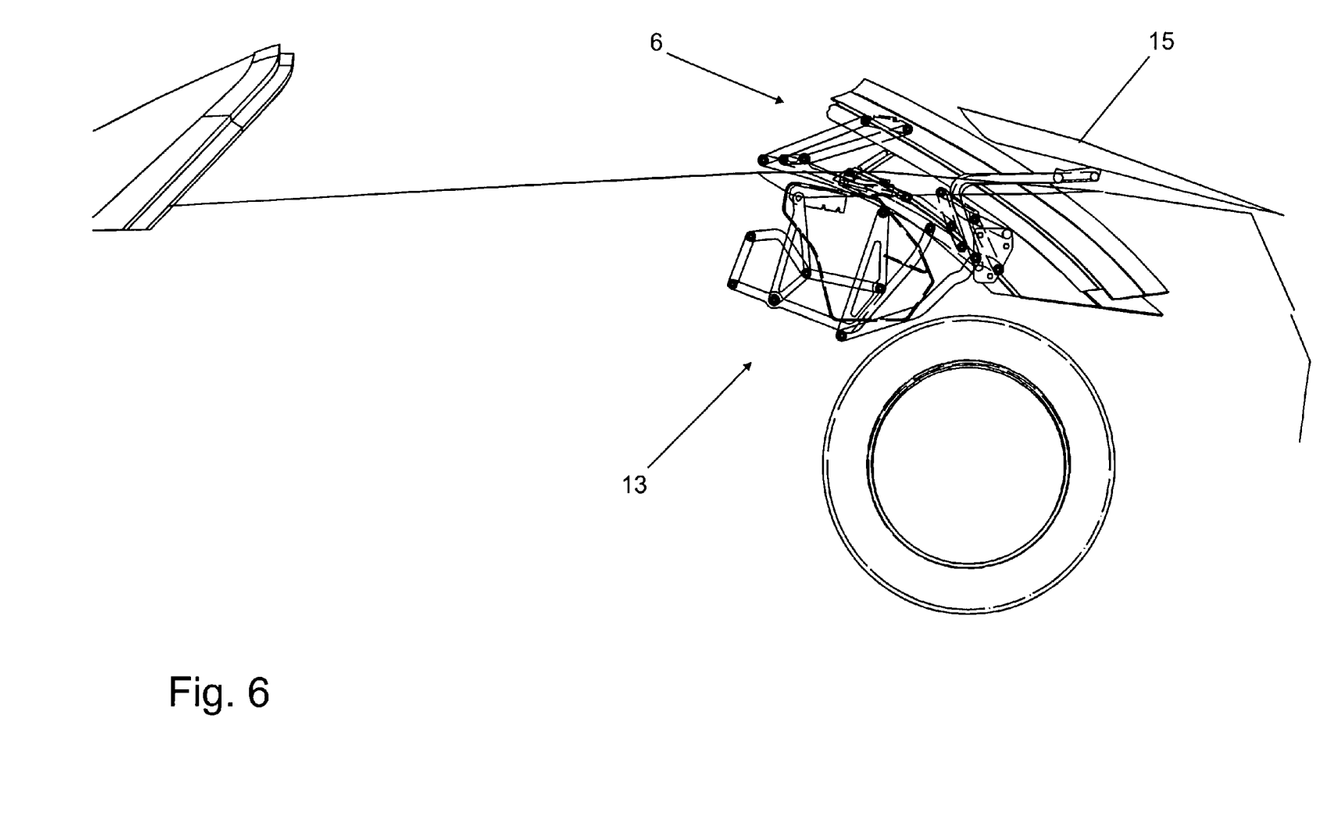
FIG. 6 shows the top from FIG. 1 after a fifth step of an opening movement of the top.
Figure 7:
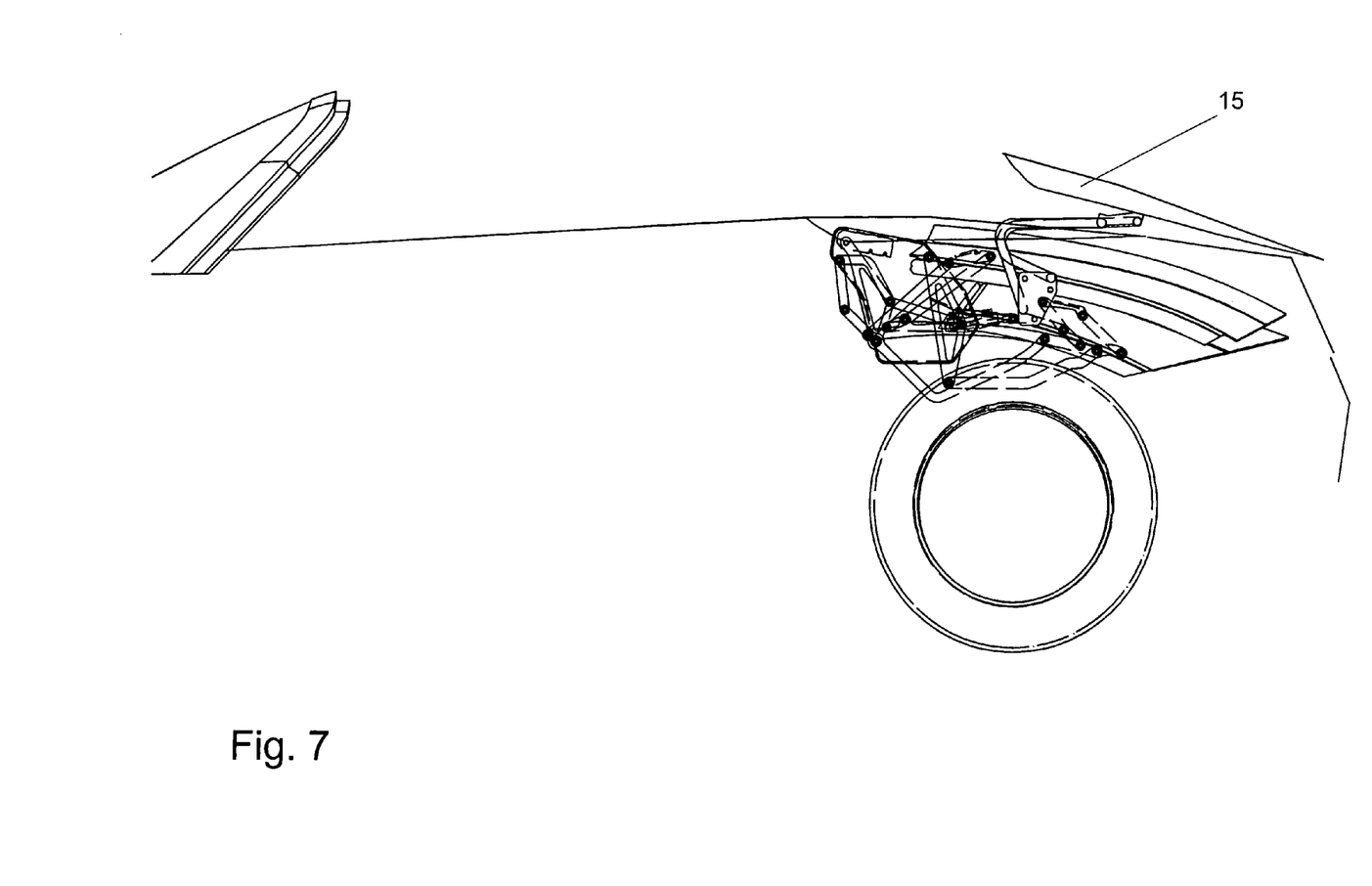
FIG. 7 shows the top from FIG. 1 after a sixth step of an opening movement of the top.
Figure 8:
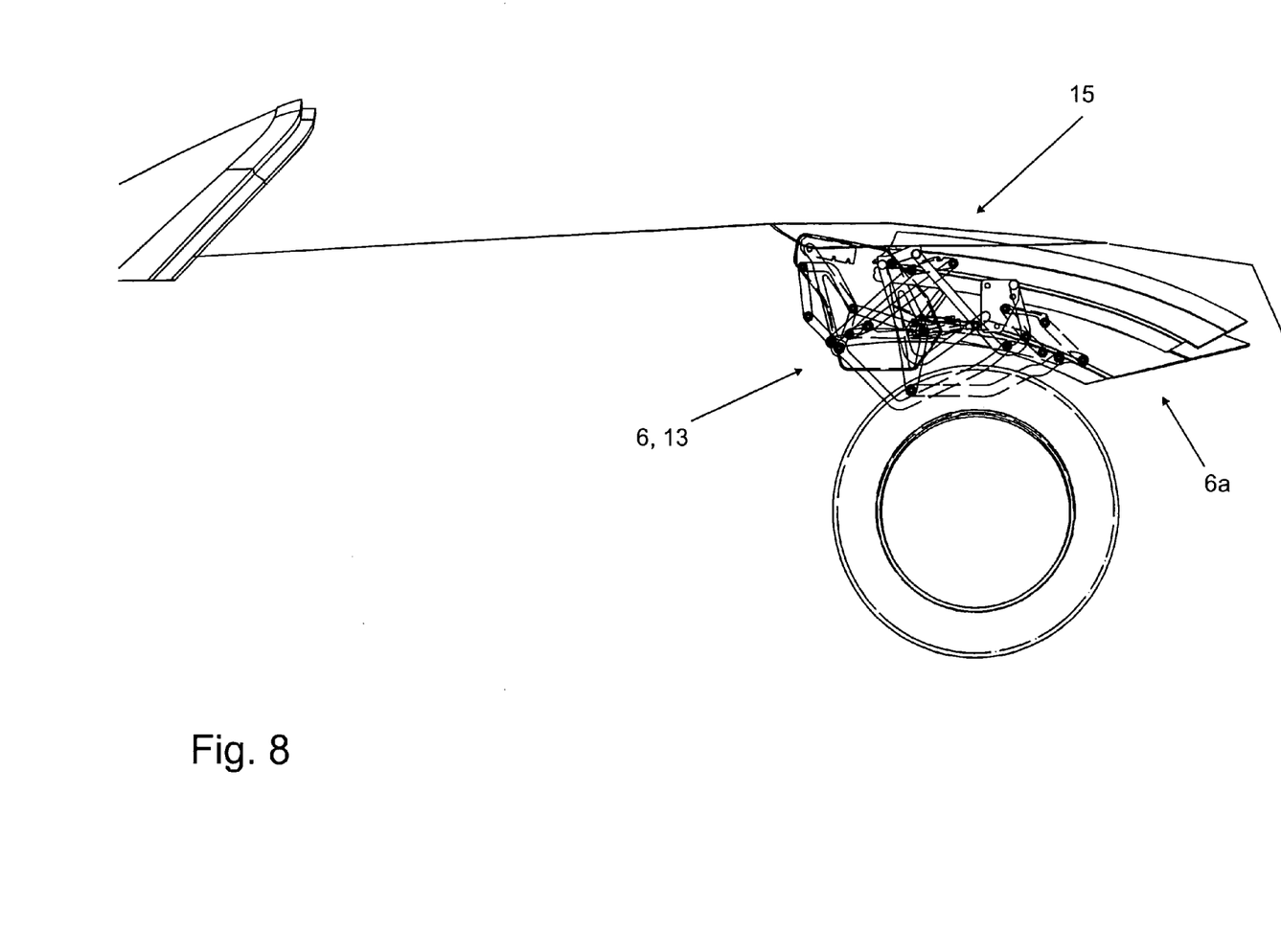
FIG. 8 shows the top from FIG. 1 in a completely open state, the roof module which is designed to form a package of roof parts being put away in a rear storage region of the vehicle.
Figure 9:
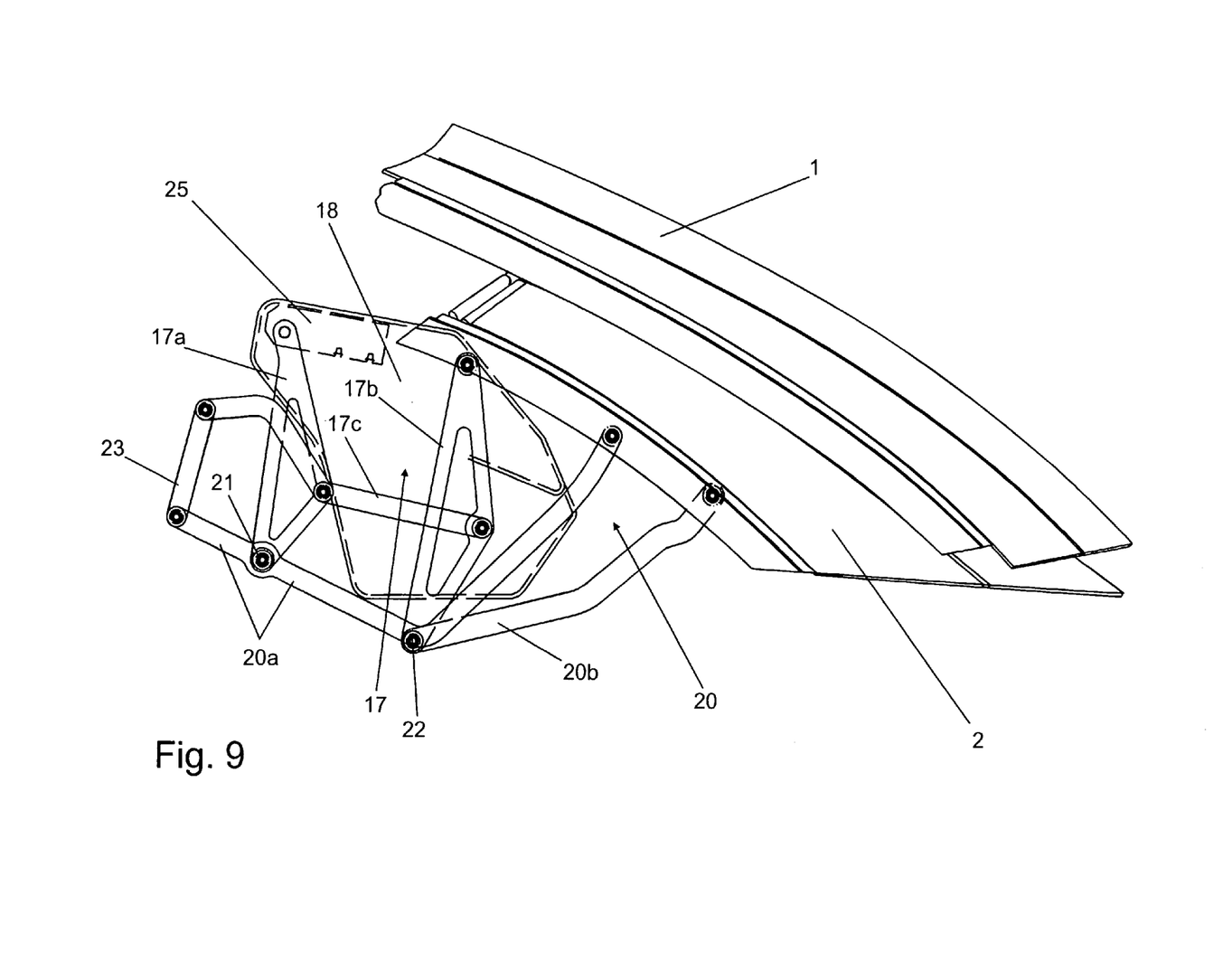
FIG. 9 shows an enlarged view of a detail of the top from FIG. 1 in an intermediate step of an opening movement of the top.

The preferred exemplary embodiment of a top according to the invention comprises a front roof part 1 and a rear roof part 2, the front roof part 1 being fastened releasably to a windshield frame 30 in a closed state of the top (see FIG. 1). The rear roof part 2 comprises a rear window and rests on a top-compartment lid 15 from above in the closed state of the top. In the closed state of the top, a front section 15*a* of the top-compartment lid 15 is situated, in the direction of travel, in front of a rear closing edge 2*a*, which is provided with seals, of the rear roof part 2 and therefore in the region of the vehicle interior. The front section 15*a* of the top-compartment lid 15 is of integral design with the top-compartment lid 15 and, in the closed state of the top, corresponds to the region of a rear parcel shelf.

The top-compartment lid 15 is connected movably to the vehicle body 16 by means of a four-bar linkage 15*c* which is provided with a drive (not illustrated). A storage region 24 for the top is situated below the top-compartment lid 15. In the direction of travel behind the top-compartment lid 15, a conventional trunk lid 26 is provided on the body 16. This is made possible in particular by the fact that the top-compartment lid 15 can be configured to be particularly small on account of the optimized stowage movement of the top according to the invention.

The front roof part 1 and the rear roof part 2 are connected movably to a supporting link 10 by means of a front four-bar linkage 11 and by means of a rear four-bar linkage 12, respectively. The front roof part 1 and the rear roof part 2 in each case form a connecting bar of the front four-bar linkage 11 and of the rear four-bar linkage 12, respectively, and the supporting link 10 in each case forms a base of the front four-bar linkage 11 and of the rear four-bar linkage 12. A control link 4 connects the front four-bar linkage 11 to the rear four-bar linkage 12, and a roof module drive 5 in the form of a piston/cylinder unit is connected in an articulated manner at one end to the supporting link 10 and at the other end to the control link 4.

Overall, a closed, positively controlled chain of links in the form of a ten-joint linkage is therefore formed by the supporting link, the front four-bar linkage 11, the rear four-bar linkage 12 and the control link 4. The ten-joint linkage can be driven by the roof module drive 5.

Figure 10:
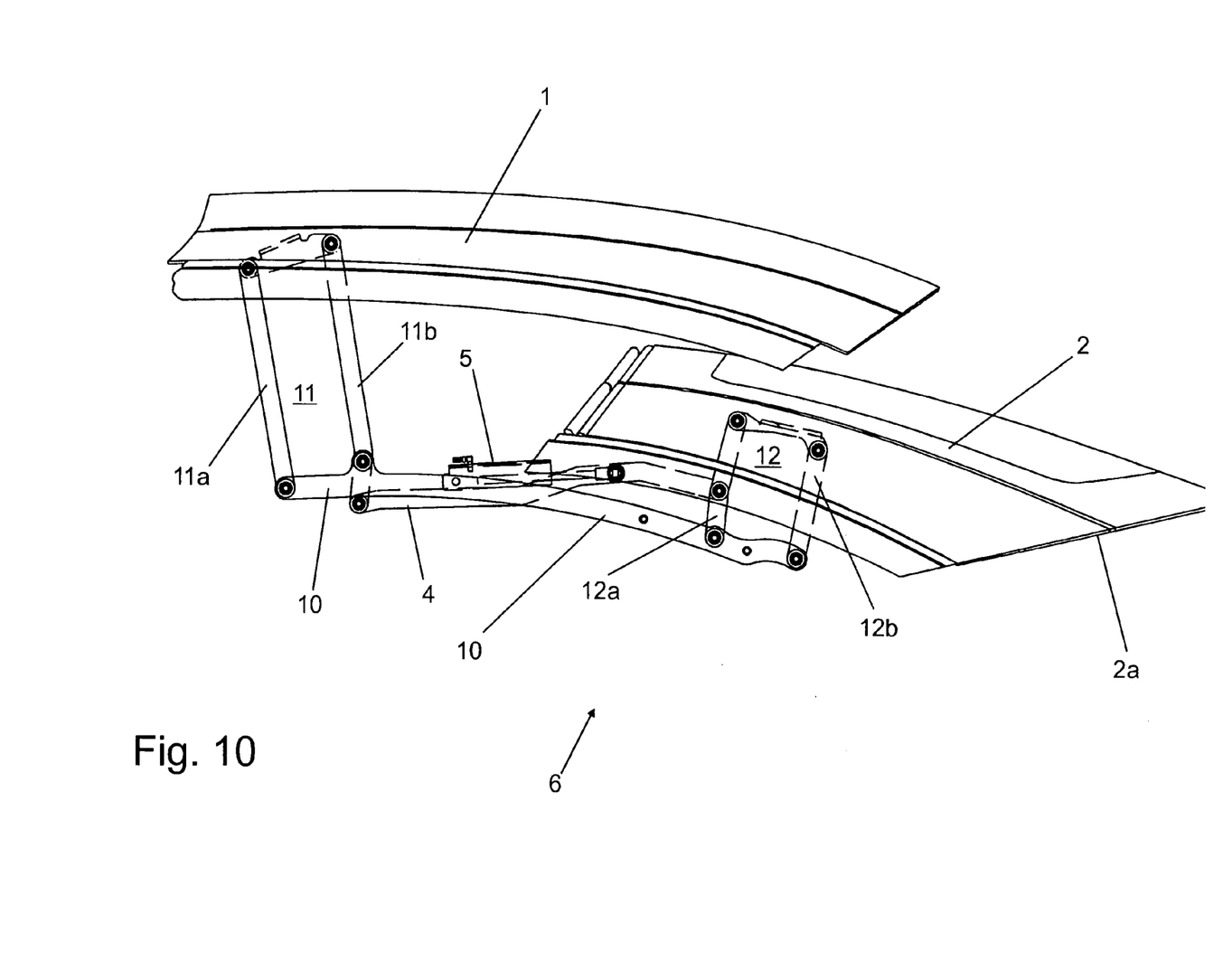
FIG. 10 shows a roof module of the top from FIG. 1 in an intermediate step of an opening movement of the top.

The previously described ten-joint linkage, which comprises the front roof part 1 and the rear roof part 2, forms a roof module 6. An enlarged overall view of the roof module 6 is shown in FIG. 10. The roof module is situated here in an intermediate step of an opening movement of the top before the formation of a package of roof parts is finished.

The term roof module is to be understood in general here in the sense that the roof module comprises a plurality of rigid roof parts which, before they are put away in a rear-side storage region of a convertible vehicle, are first of all moved relative to one another in order to form the package of roof parts. In this case, at least in a last section of a opening movement of the roof module, the roof parts are no longer or are at least no longer substantially moved with respect to one another. In the special case of a hard-shell collapsible top just as a single part, the roof module comprises just this one rigid roof part.

The roof module 6 of the preferred exemplary embodiment is connected movably to the vehicle body 16 by means of a main link mechanism 13.

The main link mechanism 13 comprises a bearing housing 18 which is connected fixedly to the body 16. A first main link 17a and a second main link 17b are held rotatably on the bearing housing 18. For stability reasons, the first main link 17a and the second main link 17b are in each case formed as a triangular framework.

A main connecting link 17c is connected to the first main link 17a and the second main link 17b in an articulated manner in each case, with the result that the bearing housing 18 (or the body 16), the first main link 17a, the second main link 17b and the main connecting link 17c form a main four-bar linkage 17 overall.

A second four-bar linkage 20 which comprises a first link 20a and a second link 20b is constructed on the main four-bar linkage 17. In this case, the first link 20a is connected to one end of the first main link 17a in a joint 21. The second link 20b is connected to the second main link 17b in a joint 22. The first link 20a and the second link 20b are connected in each case to the supporting link 10 in an articulated manner. The supporting link 10 therefore forms the connecting bar of the second four-bar linkage 20.

The base of the second four-bar linkage 20 is formed by the distance between the links 20, 21, which distance is defined in each position of the main link mechanism 13. On closer inspection, the base of the second four-bar linkage therefore has a base of variable length. Since, in the present exemplary embodiment, the main four-bar linkage is designed, however, as a good approximation to a parallelogram mechanism, the distance between the joints 21, 22 remains essentially constant over the sequence of movement of the main link mechanism.

A control link 23 is connected at its one end to the main connecting link 17c and at its other end to an extension of the first link 20a in an articulated manner. By this means, the main four-bar linkage 17 and the second four-bar linkage 20 are connected to each other in a positively controlled manner. Overall, the main link mechanism 13 can therefore be regarded as a positively controlled ten-joint linkage. The eight links of the main link mechanism designed as a ten-joint linkage are therefore: the bearing element 18 (or the vehicle body 16), the first main link 17a, the second main link 17b, the main connecting link 17c, the first link 20a, the second link 20b, the supporting link 10 and the control link 23.

If the ten-joint linkage of the main link mechanism 13 is viewed as a coupling of the main four-bar linkage 17 with the second four-bar linkage 20, which is constructed on the main four-bar linkage, it is the case that, during a movement of the main link mechanism 13, the second four-bar linkage 20 is pivoted in a direction opposed to the direction main four-bar linkage 17 is pivoted in. This in particular compensates for the space-consuming pivoting movement of a single four-bar linkage, with the result that the roof module 6, the spatial position of which is determined in the present case by the spatial position of the supporting link 10, essentially executes a linear movement.

In general, this movement which has been made possible by the use of a ten-joint linkage is an S-shaped movement. Appropriate adaptation of the ratios of the link lengths of the main link mechanism enables the S shape of the movement to be emphasized to a greater or lesser extent. The movements which can be achieved also include an approximately linear movement of the roof module 6.

As an alternative to the previously described construction of the main link mechanism, the second four-bar linkage 20 may also rest on the main connecting link 17c of the main four-bar linkage 17, with the result that said main connecting link forms the base of the second four-bar linkage 20, said base being of constant length.

The main link mechanism is provided with a power input unit 25 designed as a rotatory hydraulic cylinder. Said unit is fastened to the bearing housing 18 and drives the front main link 17a.

The Invention now Functions as Follows:

Starting from the closed position of the top according to FIG. 1, first of all the fastening of the front roof part 1 to the windshield frame 30 is released and then the driving cylinder 5 of the roof module 6 actuated. This causes the rear roof part 2 and the front roof part 1 to be pivoted at the same time on account of the previously described, positively controlled connection. The rear roof part 2 is pivoted in the direction of travel above the supporting link 10, it being lifted off from the top-compartment lid 15, giving free the top compartment lid 15. The front roof part 1 is at the same time pivoted rearward over the rear roof part 2.

After this first part of the opening movement of the top is finished, the first roof part 1 is arranged over the second roof part 2 with equally directed convexities. The package of roof parts thus formed is essentially designed as an elongate, compact body which has an end-side cross-sectional surface 6a.

After the top-compartment lid 15 is given free, it is pivoted upward counter to the direction of travel by means of the driven four-bar linkage 15c. This opens up an opening 24a in the storage region 24, which opening essentially corresponds to the cross-sectional surface 6a.

In the following part of the opening movement of the top, the main link mechanism 13 is pivoted by means of the power input unit 25, with the result that the roof module 6, which has been pivoted to form the package, is placed into the storage region 24 of the vehicle (FIG. 4 to FIG. 7). During this section of movement the roof module remains unchanged per se, so that a spatial shape enveloping the roof module is constant. The approximately linear form of movement which has been made possible by the main link mechanism enables the roof module 6 to be inserted essentially in its longitudinal direction into the storage region, with the result that the previously described, small opening 24a in the storage region is sufficient. In this case, a slight S shape of the movement of the roof module 6 is altogether advantageous, so that the put-away roof module is finally arranged in a more horizontal manner than during the movement section, in which it is moved by means of its small, end-side cross-sectional surface 6a through the opening 24a, as into a mailbox slot. By means of the horizontal end position, to reach which the roof module 6 is rotated counterclockwise, according to the drawings (in particular FIG. 6 and FIG. 7), in a last section of movement, a particularly large stowage space below the put-away roof module 6 is made accessible.

In a last section of the opening movement of the top, the top-compartment lid pivots shut again.

Both in the open and in the closed state of the top, the rear-side stowage-space volume of the vehicle is accessible in a simple manner via the trunk lid 26, which is designed in a conventional manner.

The closing movement of the top according to the invention takes place in a reversal of the previously described kinematics.

What is claimed is:

1. A top for a convertible vehicle, comprising:
    a roof module including at least one rigid roof part and connected to the vehicle by means of a main link mechanism, the roof module being movable over the course of an opening movement of the top into a rear-side storage region, wherein the main link mechanism includes a main four-bar linkage and a second four-bar linkage constructed on the main four-bar linkage, the second four-bar linkage being coupled in a positively controlled manner to the main four-bar linkage, and wherein the second four-bar linkage comprises two links actuating the main link mechanism.

2. A top for a convertible vehicle, comprising:
    a roof module including at least one rigid roof part and connected to the vehicle by means of a main link mechanism, the roof module being movable over the course of an opening movement of the top into a rear-side storage region, wherein the main link mechanism includes a main four-bar linkage and a second four-bar linkage constructed on the main four-bar linkage, the second four-bar linkage being coupled in a positively controlled manner to the main four-bar linkage,
    wherein a pivoting direction of the second four-bar linkage over the course of the opening movement is opposed to a pivoting direction of the main four-bar linkage.

3. The top as recited in claim 2, wherein the roof module is moveable in an opening movement of the top from a closed position, through an intermediate position, to a storage position in a rear-side storage region of the vehicle using the main link mechanism, and wherein a spatial shape enveloping the roof module in the intermediate position is unchanged during the opening movement from the intermediate position to the storage position.

4. A top for a convertible vehicle, comprising:
    a roof module including at least one rigid roof part and connected to the vehicle by means of a main link mechanism, the roof module being movable over the course of an opening movement of the top into a rear-side storage region, wherein the main link mechanism includes a main four-bar linkage and a second four-bar linkage constructed on the main four-bar linkage, the second four-bar linkage being coupled in a positively controlled manner to the main four-bar linkage,
    wherein the roof module is moveable in an opening movement of the top from a closed position, through an intermediate position, to a storage position in a rear-side storage region of the vehicle using the main link mechanism, and wherein a spatial shape enveloping the roof module in the intermediate position is unchanged during the opening movement from the intermediate position to the storage position, and
    wherein the roof module has an end-side cross-sectional surface, and wherein the rear-side storage region includes an opening corresponding essentially to the end-side cross-sectional surface for allowing the roof module through into the storage region.

5. The top as recited in claim 2, further comprising a positive control mechanism and wherein the roof module comprises a supporting link, a front roof part, and a rear roof part, the front roof part and the rear roof part being connected to the supporting link using the positive control mechanism.

6. The top as recited in claim 4, wherein a central roof part forming a unit together with the supporting link is provided.

7. The top as recited in claim 4, wherein the roof module is moveable in an opening movement of the top from a closed position, through an intermediate position, to a storage position in a rear-side storage region of the vehicle using the main link mechanism, and wherein the roof module is arranged essentially as a package of roof parts arranged one above the other in the intermediate position.

8. The top as recited in claim 2, wherein the roof module includes at least two rigid roof parts, and wherein one of the at least two rigid roof parts forms a link of the main link mechanism.

9. The top as recited in claim 2, wherein at least one rigid roof part is a single rigid roof part forming a link of the main link mechanism.

10. The top as recited in claim 2, wherein the main link mechanism is configured as a ten-joint linkage.

11. The top as recited in claim 10, wherein a body of the vehicle forms a base of the ten-joint linkage and wherein the roof module forms a connecting bar of the ten-joint linkage.

12. The top as recited in claim 2, wherein the main link mechanism is configured as a thirteen-joint linkage.

13. A top for a convertible vehicle, comprising:
    a roof module including at least one rigid roof part and connected to the vehicle by means of a main link mechanism, the roof module being movable over the course of an opening movement of the top into a rear-side storage region, wherein the main link mechanism includes a main four-bar linkage and a second four-bar linkage constructed on the main four-bar linkage, the second four-bar linkage being coupled in a positively controlled manner to the main four-bar linkage,
    wherein one link of the main link mechanism is configured to be variable in length.

14. The top as recited in claim 13, wherein the one link is configured as a piston/cylinder unit.

15. The top as recited in claim 2, further comprising a power input unit configured to move the main link mechanism.

16. The top as recited in claim 2, further comprising a pivotable top-compartment lid configured to close the storage region in an open state of the top.

17. The top as recited in claim 16, further comprising a trunk lid pivotable with respect to the vehicle body independently of the top-compartment lid.

18. The top as recited in claim 2, wherein one link of the main link mechanism is configured to be variable in length.

19. The top as recited in claim 1, wherein the main four-bar linkage is assigned to the body.

20. The top as recited in claim 1, wherein the at least one rigid roof part can be displaced with respect to said main link mechanism without displacing said main four-bar linkage.

21. The top as recited in claim 1, wherein a first link of the main four-bar linkage is pivotably connected to a first link of the second four-bar linkage in a first joint, wherein a second link of the main four-bar linkage is pivotably connected to a second link of the second four-bar linkage in a second joint, and wherein a connecting bar connects said first link and said second link of the main four-bar linkage in a third joint and in a fourth joint.

* * * * *

UNITED STATES PATENT AND TRADEMARK OFFICE
CERTIFICATE OF CORRECTION

| | | |
|---|---|---|
| PATENT NO. | : 7,178,852 B2 | |
| APPLICATION NO. | : 10/976705 | |
| DATED | : February 20, 2007 | |
| INVENTOR(S) | : Klaus Obendiek and Franz Haberl | |

It is certified that error appears in the above-identified patent and that said Letters Patent is hereby corrected as shown below:

In col. 8, lines 4 and 5, claim 6 should read: --The top as recited in claim 5, wherein a central roof part forming a unit together with the supporting link is provided.--

In col. 8, lines 8 to 12, claim 7 should read: --The top as recited in claim 5, wherein the roof module is moveable in an opening movement of the top from a closed position, through an intermediate position, to a storage position in a rear-side storage region of the vehicle using the main link mechanism, and wherein the roof module is arranged essentially as a package of roof parts arranged one above the other in the intermediate position.--

Signed and Sealed this

Twenty-ninth Day of May, 2007

JON W. DUDAS
*Director of the United States Patent and Trademark Office*